United States Patent
Watanabe

(10) Patent No.: US 9,225,874 B2
(45) Date of Patent: Dec. 29, 2015

(54) IMAGE READING APPARATUS CAPABLE OF OUTPUTTING A PLURALITY OF TYPES OF IMAGE DATA

(71) Applicant: BROTHER KOGYO KABUSHIKI KAISHA, Nagoya-shi, Aichi-ken (JP)

(72) Inventor: Toshihiro Watanabe, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/521,926

(22) Filed: Oct. 23, 2014

(65) Prior Publication Data
US 2015/0131132 A1 May 14, 2015

(30) Foreign Application Priority Data
Nov. 8, 2013 (JP) .................................. 2013-232268

(51) Int. Cl.
H04N 1/04 (2006.01)
H04N 1/21 (2006.01)
H04N 1/46 (2006.01)
H04N 1/48 (2006.01)
H04N 1/407 (2006.01)

(52) U.S. Cl.
CPC ........... *H04N 1/2195* (2013.01); *H04N 1/4072* (2013.01); *H04N 1/465* (2013.01); *H04N 1/48* (2013.01); *H04N 2201/0081* (2013.01); *H04N 2201/218* (2013.01)

(58) Field of Classification Search
CPC ....... H04N 1/2105; H04N 1/465; H04N 1/48; H04N 1/4072; H04N 2201/0081; H04N 2201/218
USPC ........................... 358/538, 505, 474, 498, 1.1
See application file for complete search history.

(56) References Cited

U.S. PATENT DOCUMENTS

| 7,551,313 | B2* | 6/2009 | Kuroki | G06F 3/1205 358/1.16 |
| 2006/0221415 | A1* | 10/2006 | Kawamoto | H04N 1/00236 358/518 |
| 2007/0121161 | A1* | 5/2007 | Yamada | H04N 1/00954 358/1.16 |

FOREIGN PATENT DOCUMENTS

| JP | 9-23341 A | 1/1997 |
| JP | 2001-292279 A | 10/2001 |
| JP | 2006-246328 A | 9/2006 |
| JP | 2006-261927 A | 9/2006 |

* cited by examiner

*Primary Examiner* — Houshang Safaipour
(74) *Attorney, Agent, or Firm* — Merchant & Gould PC

(57) ABSTRACT

In an image reading apparatus, a control device controls a reading unit to start reading a document; stores first image data in a storage unit on a block-to-block basis to sequentially store each of a plurality of first blocks of data, the plurality of first blocks included in the first image data; performs, each time each first block of data is stored in the storage unit, a plurality of image processing on the first block of data to generate a second block of data including a plurality of types of data different from one another; and deletes one of the plurality of first blocks of data from the storage unit after completion of the plurality of image processing on the one of the plurality of first blocks of data before completion of the plurality of image processing on all of the plurality of first blocks of data.

14 Claims, 7 Drawing Sheets

IMAGE READING APPARATUS CAPABLE OF OUTPUTTING A PLURALITY OF TYPES OF IMAGE DATA

CROSS REFERENCE TO RELATED APPLICATION

This application claims priority from Japanese Patent Application No. 2013-232268 filed Nov. 8, 2013. The entire content of the priority application is incorporated herein by reference.

TECHNICAL FIELD

The present invention relates to an image reading apparatus.

BACKGROUND

There is conventionally known an image reading apparatus for reading a document, configured to perform different image processing based on image data corresponding to a read image to generate a plurality of different image data. For example, US Application Publication No. 2006/0221415A1 discloses a color copier that executes, as image processing, color image data generation processing and monochrome image data generation processing and executes, in parallel with determination processing of determining whether an input image is a color image or a monochrome image, and then quickly transfers to an external device one of the color and monochrome image data in accordance with a result of the determination.

SUMMARY

However, the above-described conventional technology has the following problem. When the plurality of different image data are generated based on image data corresponding to the read image, a storage unit for temporarily storing the image data of the read image is required. In recent years, a data size of image data tends to increase as a resolution of a color image becomes higher, and a large capacity storage unit increases cost. US Application Publication No. 2006/0221415A1 does not mention saving of the storage unit, and there is room for improvement on this point.

In view of the foregoing, it is an object of the invention to provide technology concerning an image reading apparatus with which effective use of a storage unit for image data can be expected.

In order to attain the above and other objects, the invention provides an image reading apparatus that may include a reading unit, a storage unit, and a control device. The reading unit may be configured to read a document. The control device may be configured to: control the reading unit to start reading the document, causing first image data to be generated following reading of the document, the generated first image data having one page's worth of data size and comprising a plurality of first blocks of data, each of the plurality of first blocks of data having a predetermined data size less than the one page's worth of data size; store the generated first image data in the storage unit on a block-to-block basis to sequentially store each of the plurality of first blocks of data; perform, each time each of the plurality of first blocks of data is stored in the storage unit, a plurality of image processing on the each of the plurality of first blocks of data to generate a second block of data including a plurality of types of data different from one another, one page's worth of second image data being generated by performing the plurality of image processing on the plurality of first blocks of data; and delete one of the plurality of first blocks of data stored in the storage unit after completion of the plurality of image processing on the one of the plurality of first blocks of data before completion of the plurality of image processing on all of the plurality of first blocks of data.

According to another aspect, the present invention provides an image reading apparatus that may include a reading unit, a storage unit, and a control device including a buffer memory. The reading unit may be configured to read a document. The control device may be configured to: control the reading unit to start reading the document, causing first image data to be generated following reading of the document, the generated first image data having one page's worth of data size and comprising a plurality of first blocks of data, each of the plurality of first blocks of data having a predetermined data size less than the one page's worth of data size; store the generated first image data in the storage unit on a block-to-block basis to sequentially store each of the plurality of first blocks of data; acquire the generated first image data from the storage unit on a block-to-block basis to sequentially store each of the plurality of first blocks of data in the buffer memory; perform, each time each of the plurality of first blocks of data is stored in the buffer memory, a plurality of image processing on the each of the plurality of first blocks of data to generate a second block of data including a plurality of types of data different from one another, one page's worth of second image data being generated by performing the plurality of image processing on the plurality of first blocks of data; and delete one of the plurality of first blocks of data stored in the storage unit after completion of storing the one of the plurality of first blocks of data in the buffer memory before completion of the plurality of image processing on all of the plurality of first blocks of data.

According to another aspect, the present invention provides a method that may include: controlling a reading unit to start reading a document, causing first image data to be generated following reading of the document, the generated first image data having one page's worth of data size and comprising a plurality of first blocks of data, each of the plurality of first blocks of data having a predetermined data size less than the one page's worth of data size; storing the generated first image data in a storage unit on a block-to-block basis to sequentially store each of the plurality of first blocks of data; performing, each time each of the plurality of first blocks of data is stored in the storage unit, a plurality of image processing on the each of the plurality of first blocks of data stored in the buffer memory to generate a second block of data including a plurality of types of data different from one another, one page's worth of second image data being generated by performing the plurality of image processing on the plurality of first blocks of data; and deleting one of the plurality of first blocks of data stored in the storage unit after completion of the plurality of image processing on the one of the plurality of first blocks of data before completion of the plurality of image processing on all of the plurality of first blocks of data.

According to another aspect, the present invention provides a method that may include: controlling a reading unit to start reading a document, causing first image data to be generated following reading of the document, the generated first image data having one page's worth of data size and comprising a plurality of first blocks of data, each of the plurality of first blocks of data having a predetermined data size less than the one page's worth of data size; storing the generated first image data in a storage unit on a block-to-block basis to sequentially store each of the plurality of first blocks of data;

acquiring the generated first image data from the storage unit on a block-to-block basis to sequentially store each of the plurality of first blocks of data in a buffer memory; performing, each time each of the plurality of first blocks of data is stored in the buffer memory, a plurality of image processing on the each of the plurality of first blocks of data stored in the buffer memory to generate a second block of data including a plurality of types of data different from one another, one page's worth of second image data being generated by performing the plurality of image processing on the plurality of first blocks of data; and deleting one of the plurality of first blocks of data stored in the storage unit after completion of storing the one of the plurality of first blocks of data in the buffer memory before completion of the plurality of image processing on all of the plurality of first blocks of data.

BRIEF DESCRIPTION OF THE DRAWINGS

The particular features and advantages of the invention as well as other objects will become apparent from the following description taken in connection with the accompanying drawings, in which.

DETAILED DESCRIPTION

An image reading apparatus according to an embodiment of the present invention will be described with reference to FIGS. 1-7. In the embodiment, the present invention is applied to a color image scanner.

Figure 1:
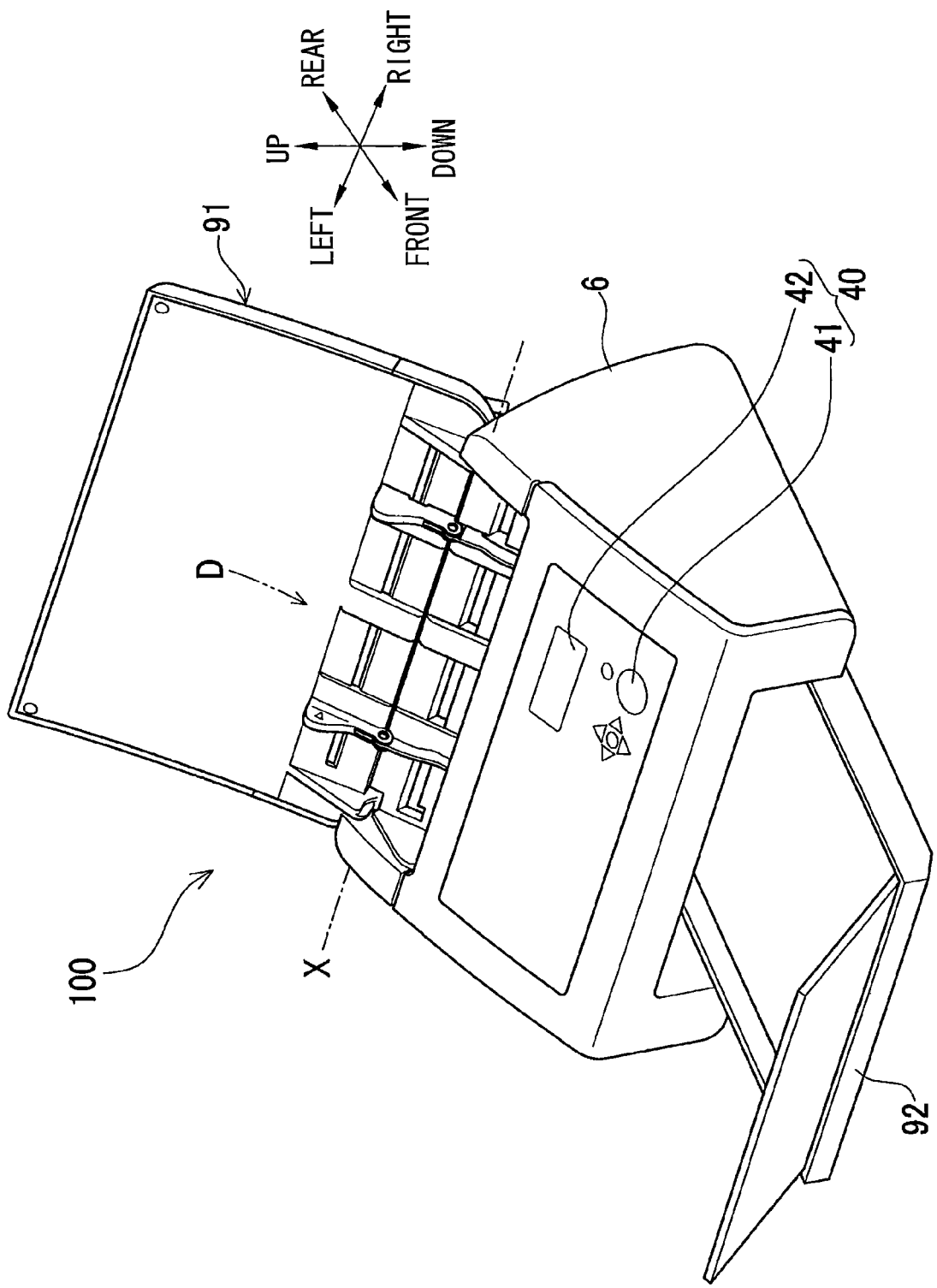
FIG. 1 is a perspective view of a scanner according to an embodiment of the present invention.
Figure 2:
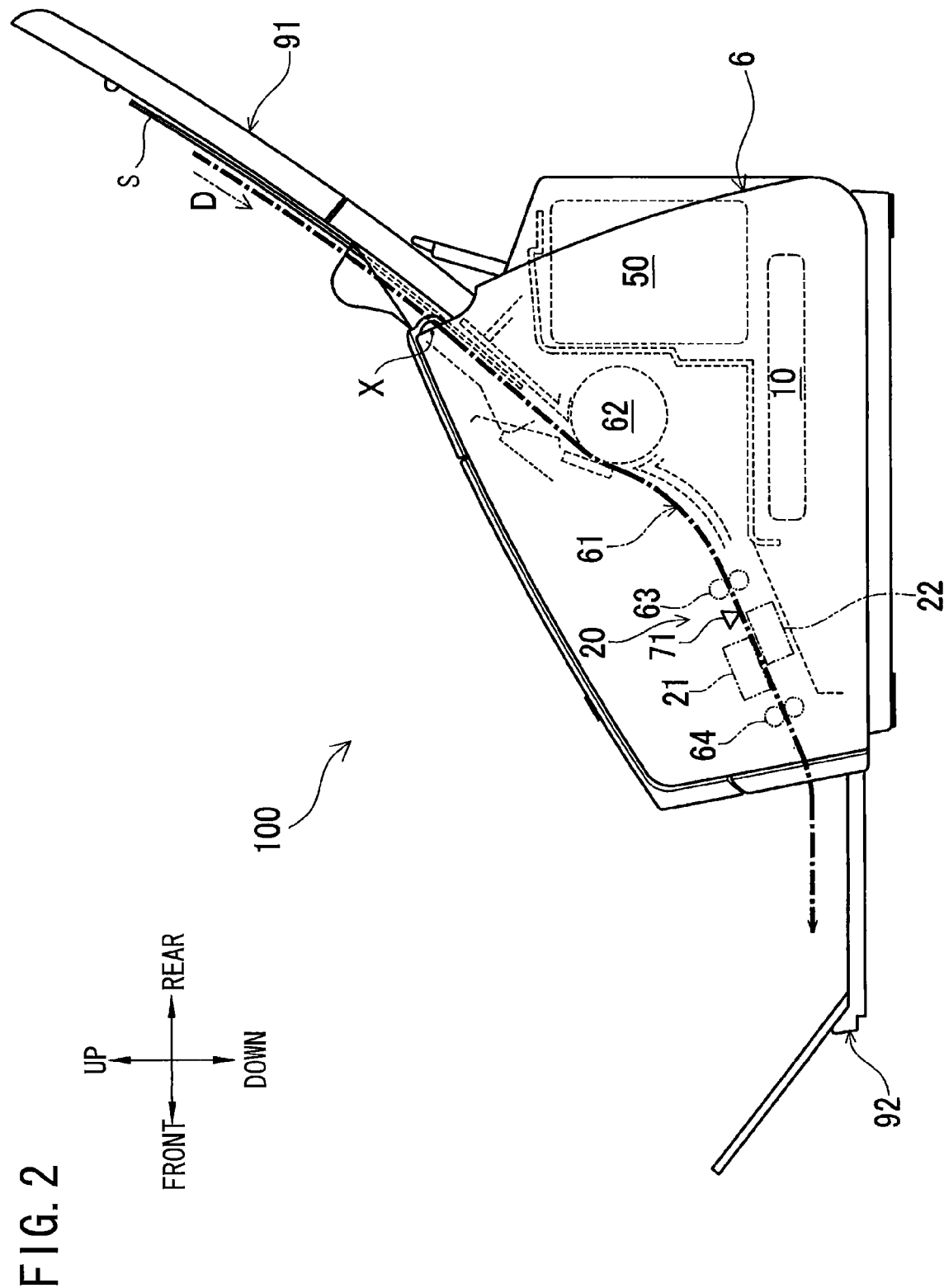
FIG. 2 is a cross sectional view showing an internal configuration of the scanner shown in FIG. 1.
Figure 3:
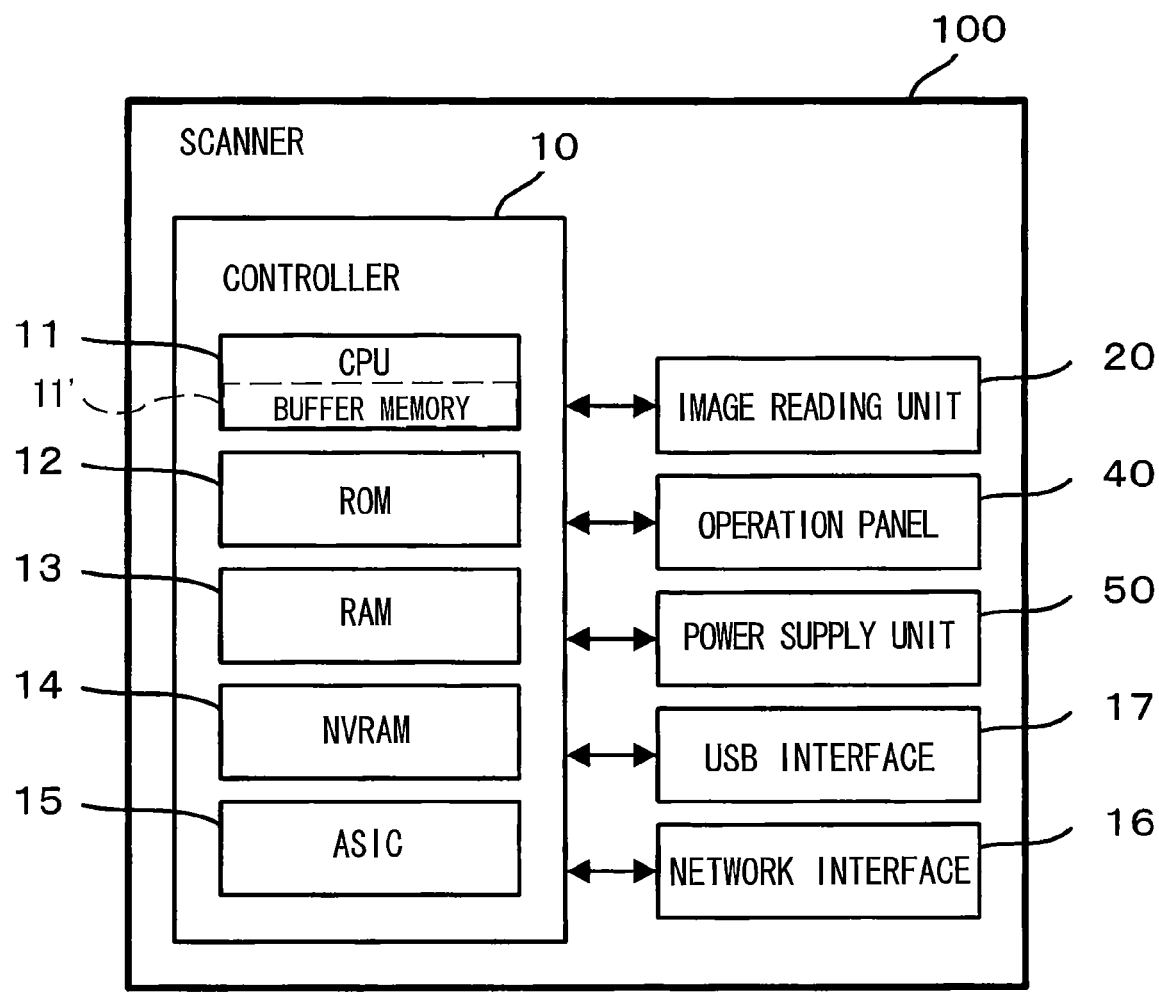
FIG. 3 is a block diagram showing an electrical configuration of the scanner shown in FIG. 1.

As illustrated in FIG. 1, a scanner 100 according to the embodiment includes a casing 6, a document placement tray 91, and a discharge tray 92, an operation panel 40, an image reading unit 20 (FIG. 2), a controller 10 (FIG. 2), a power supply unit 50 (FIG. 2), a USB interface 17 (FIG. 3), and a network interface 16 (FIG. 3).

The casing 6 covers a main body of the scanner 100. The document placement tray 91 is positioned to an upper rear portion of the casing 6 and is supported by the casing 6 so as to be pivotable around a pivot axis X extending in the left-right direction. The discharge tray 92 is positioned on a lower portion of the casing 6 and accommodated in the casing 6 so as to be insertable and drawable in the front-rear direction.

The operation panel 40 is provided on an upper surface of the casing 6. The operation panel 40 is provided with a button group 41 including various buttons (e.g., a start key, a stop key, and buttons of a numeric keypad), and a display unit 42 embodied by a liquid-crystal display.

As denoted by arrows in FIG. 1, directions of the scanner 100 are defined as follows: the discharge tray 92 side is defined as a front side of the scanner 100, and a left side and a right side when viewed from the discharge tray 92 side are defined as a left side and a right side of the scanner 100, respectively.

FIG. 2 illustrates an internal configuration of the scanner 100. A conveying path 61 is provided inside the casing 6 and extends from the document placement tray 91 to the discharge tray 92. A sheet of document S is conveyed along the conveying path 61 in a conveying direction of the document S denoted by an arrow D in FIGS. 1 and 2.

The image reading unit 20 is disposed in the casing 2 and is configured to read image from the document S. The image reading unit 20 includes a supply roller 62, a first conveying roller 63, a sheet detection sensor 71, image sensors 21 and 22, and a second conveying roller 64. Along the conveying path 61, the supply roller 62, the first conveying roller 63, the sheet detection sensor 71, the image sensors 21, 22, and the second conveying roller 64 are disposed in this order from an upstream side in the conveying direction D. In other words, the sheet sensor 71 is positioned upstream of the image sensor 21 in the conveying direction D.

The image sensors 21 and 22 are configured such that one of them reads an image on one surface of the document S and the other one of them reads an image on the other surface of the document S. Each of the image sensors 21 and 22 includes optical elements arranged in a row in the left-right direction (depth direction in FIG. 2). Each of the image sensors 21 and 22 is configured to convert a light reflected from the document S into an electrical signal and to output the obtained electrical signal. For example, a CIS (Contact Image Sensor) or a CCD (Charge Coupled Device) can be employed as the image sensors 21 and 22. The image sensors 21 and 22 can read a color image, a grayscale image, and a monochrome image. The image sensors 21 and 22 serve examples of a reading unit.

The supply roller 62, the first conveying roller 63, and the second conveying roller 64 are configured to convey the document S from the document placement tray 91 to the discharge tray 92 in the conveying direction D. Specifically, when a user places the document on the document placement tray 91 as shown in FIG. 2 to execute a reading operation of the scanner 100, the document S moves from the document placemen tray 91 to the supply roller 62 by its own weight and then is conveyed by the supply roller 62 (one by one, when a plurality of documents 9 are placed) to a downstream side of the conveying path 61. While moving on the conveying path 61, the document S is read by the image sensor 21 and/or the image sensor 22 when passing through the image reading unit 20. The document S read by the image sensor 21, 22 is discharged onto the discharge tray 92.

An electrical configuration of the scanner 100 will be described. As illustrated in FIG. 3, the controller 10 is configured to control the image reading unit 20 and the like and includes a CPU 11, a ROM 12, a RAM 13, an NVRAM (Non Volatile RAM) 14, and an ASIC 15. Note that the controller 10 in FIG. 3 is a general term representing hardware, such as the CPU 11, used for control of the scanner 100 and is not limited to single hardware actually existing in the scanner 100.

The ROM 12 stores firmware which is a control program for controlling the scanner 100, various settings, initial values, and the like. The RAM 13 is used as a working area for executing various control programs and/or a storage area for temporarily storing image data.

The CPU 11 is configured to control the components of the scanner 100 according to the control program read out from the ROM 12 or a signal sent from various sensors while storing a result of processing the control program or sensor signal in the RAM 13 or NVRAM 14. In the embodiment, the CPU 11 is an example of a control device. Alternatively, the controller 10 or the ASIC 15 may be used as the control device.

The power supply unit 50 is configured to control power supply to the various elements are incorporated in the scanner 100. The USB interface 17 and the network interface 16 each of which serves as a communication interface for connecting the image reading unit 20, the operation panel 40, the power supply unit 50, and the controller 10 to an external device. The USB interface 17 and the network interface 16 are controlled by the CPU 11. Specifically, the USB interface 17 is hardware enabling communication between the scanner 100 and the external device. For example, the scanner 100 can output read image data to a flash memory when the flash memory is connected to the USB interface 17. The USB interface 17 may be connected not only to the flash memory, but also to a personal computer (PC) or a printer, for example. When the USB interface 17 is connected to the PC, the scanner 100 can receive, from the PC, various instructions such as a scan execution instruction or a setting change instruction.

Like the USB interface 17, the network interface 16 is hardware enabling communication between the scanner 100 and another device. The scanner 100 can output read image data to an external device connected thereto via the network interface 16. Further, the scanner 100 can receive various instructions from external devices via the network interface 16.

Figure 4:
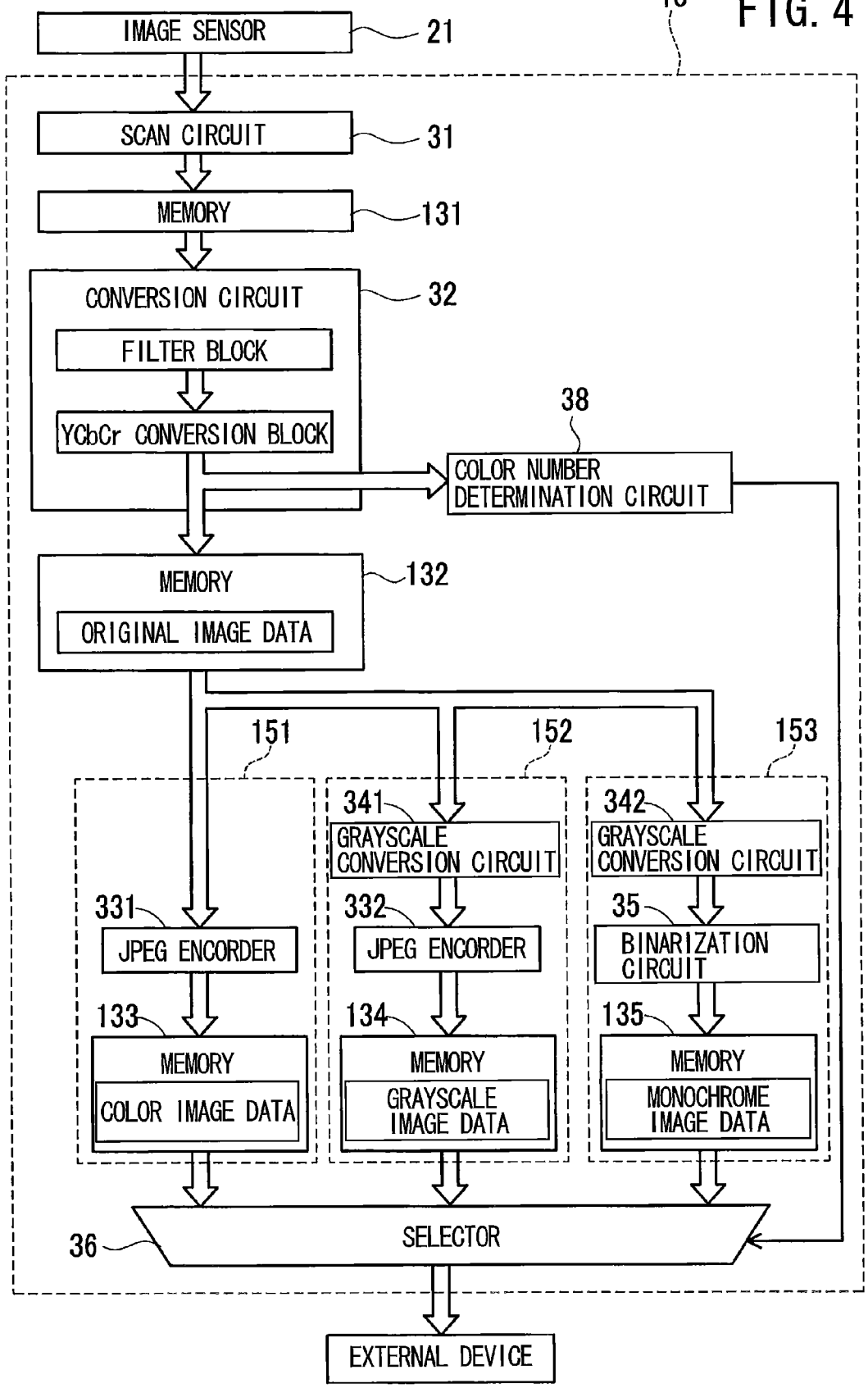
FIG. 4 is an explanatory diagram showing transition of data when image reading is executed by the scanner according to the embodiment of the invention.

An outline of a color image reading operation of the scanner 100 will be described with reference to FIG. 4. The following operations are realized by the CPU 11 using RAM 13, NVRAM 14, and ASIC 15, the programs stored in the ROM 12. Specifically, in order to output image data based on an image read by the image sensor 21, the controller 10 includes a scan circuit 31, a conversion circuit 32, generation systems 151, 152, and 153 for generating various image data, a color number determination circuit 38, a selector 36, and memories 131 and 132.

The generation system 151 generates and stores color image data, and includes a JPEG encoder 331 and a memory 133. The generation system 152 generates and stores grayscale image data, and includes a grayscale conversion circuit 341, a JPEG encoder 332, and a memory 134. The generation system 153 generates and stores monochrome image data, and includes a grayscale conversion circuit 342, a binarization circuit 35, and a memory 135. The generation systems 151, 152, and 153 are image processing for generating a plurality of types of data different from one another.

The above circuits are implemented by the ASIC 15. Alternatively, a part of a function of each circuit may be realized by the programs stored in the ROM 12. The memories 131, 132, 133, 134, and 135 in FIG. 4 are volatile memories included in the RAM 13 and may be formed as separated memories or separately allocated memory areas in one storage device. Similarly, the generation systems 151, 152, and 153 may be formed as separate systems or formed on a single substrate. The same configuration is employed when an image is read by the image sensor 22.

When a color image is read by the image sensor 21, the scanner 100 determines whether the read image is a color image, a grayscale image, or a monochrome image and outputs image data of a suitable format for a result of the determination. Specifically, when the read image is determined to be a color image or a grayscale image, the controller 10 outputs JPEG data which is image data compressed by a JPEG scheme so as to suppress increase in data size. On the other hand, when the read image is determined to be a monochrome image, the controller 10 outputs a bit-map data which is binary non-compressed image data. This is because the monochrome image has a size of image data smaller than that of the color image and the grayscale image. And then, the image data is output to an external device such as a PC, a flash memory, or a printer.

In the process for realizing the above-described color image reading operation, the scanner 100 first converts, through the scan circuit 31, a signal output from the image sensor 21 into RGB data and then stores the RGB data in the memory 131.

After the RGB data is stored in the memory 131, the conversion circuit 32 converts the RGB data into YCbCr data. In addition to the conversion from the RGB data to YCbCr data, the conversion circuit 32 executes filtering for noise removal. The conversion circuit 32 stores the obtained YCbCr data in the memory 132. The conversion from the RGB data to YCbCr data is executed every time predetermined amount of the RGB data are stored in the memory 131. In other words, the YCbCr data is stored in a block-to-block basis in order to sequentially store each of a plurality of blocks that are made of one page's worth of YCbCr data. Hereinafter, the YCbCr data to be output from the conversion circuit 32 is referred to as "original image data". The memory 132 is an example of a storage unit.

In the generation system 151, every time the original image data corresponding to the number of compression lines is stored in the memory 132, the JPEG encoder 331 converts the original image data corresponding to the number of compression lines into JPEG data. The number of compression lines is the number of lines required for data compression. Then, color image data which is the obtained JPEG data is stored in the memory 133.

In the generation system 152, in parallel with the color image data generation processing, the grayscale conversion circuit 341 converts the original image data which is color image data into grayscale data every time the original image data corresponding to one line is stored in the memory 132. Then, the JPEG encoder 332 converts the grayscale image data corresponding to the number of compression lines into JPEG data, and the JPEG grayscale image data based on the grayscale image data is stored in the memory 134. Note that, in this embodiment, the two JPEG encoders 331 and 332 are separately provided in the color image data generation system 151 and the grayscale image data generation system 152, respectively. However, a single JPEG encoder may be shared by the systems 151 and 152.

In the generation system 153, the grayscale conversion circuit 342 converts the original image data into the grayscale data in parallel with the color image data generation processing and the grayscale image data generation processing. Then, the binarization circuit 35 binarizes the grayscale data for each line to generate bit-map data which is monochrome image data. The monochrome image data is stored in the memory 135. In the embodiment, the two grayscale conversion circuits 341 and 342 are separately provided in the grayscale image data generation system 152 and the monochrome image data generation system 153, respectively. However, a single grayscale conversion circuit may be shared by the systems 152 and 153.

The color image data, the grayscale image data, and/or the monochrome image data are image data capable of being an output object and are collectively referred to as "output candidate image data". The output candidate image data is an example of second block of data. Each of the generation systems 151, 152, and 153 outputs a generation completion notification to the conversion circuit 32 every time the output candidate image data is generated based on the original image data corresponding to one line or the number of compression lines. When the number of lines of the original image data corresponding to the generation completion notification that is outputted from a subject generation system reaches the number of deletion lines, a memory area of the memory 132 is released for amount of the original image data corresponding to the number of deletion lines. The subject generation system is a generation system still generating the output candidate image data. The number of deletion lines is the number of lines that can be deleted from the memory 132. That is, when the original image data corresponding to the number of deletion lines becomes unnecessary in all the generation systems 151, 152, and 153, the memory area of the memory 132 corresponding to the original image data corresponding to the number of deletion lines is released.

In the scanner 100, in parallel with the generation processing of the output candidate image data in the respective generation systems 151, 152, and 153, every time the original image data corresponding to the number of determination lines is converted, the color number determination circuit 38 determines whether or not an image corresponding to converted image data for the number of determination lines (a converted image) is a color image on the basis of the original image data sets corresponding to the number of the determination lines. The number of determination lines is the number of lines required to determine the number of colors. When determining that the converted image is not the color image, the color number determination circuit 38 determines whether the converted image is a grayscale image or a monochrome image.

The selector 36 is configured to select the output candidate image data according to a result of the determination from the color number determination circuit 38. The scanner 100 outputs, as output image data, the output candidate image data selected by the selector 36 to an external device as an output destination.

Specifically, when the converted image is determined to be the color image, the selector 36 selects the color image data stored in the memory 133. Further, the output candidate image data to be output to the external device is fixed to the color image data at a time point when the converted image is determined to be the color image. Accordingly, the scanner 100 starts to output the generated color image data even though the generation of the color image data is not completed for one page. Further, the grayscale image data and the monochrome image data become unnecessary when the to-be-output data is fixed to the color image data. Accordingly, generations of the grayscale image data and the monochrome image data are stopped, and the memories 134 and 135 are released. The memory 133 is released after completion of the output of the color image data.

When the color number determination circuit 38 determines, for each set of original image data constituting one page worth of image data, a corresponding converted image is a grayscale image, the selector 36 selects the grayscale image data stored in the memory 134. In other words, the selector 36 stores the grayscale image data in the memory 134 when all converted images are gray scale images. However, the converted image can still be determined to be the color image as a result of determination on un-processed other lines when another converted image is determined to be the grayscale image until the color number determination circuit 38 completes the color number determination for one page worth of original image data. Therefore, the scanner 10 does not start to output the grayscale image data until the color number determination for original image data corresponding to the entire of one page is completed. The memory 134 is released after completion of the output of the grayscale image data, and the memories 133 and 135 are released after output of the grayscale image data is started.

When the converted image is not yet determined to be the color image or the grayscale image even after completion of the color number determinations for one page worth, the converted image is determined to be a monochrome image. When the converted image is determined to be the monochrome image, the scanner 100 outputs the monochrome image data stored in the memory 135 to the external device. As in the case of the grayscale image, output of the monochrome image data is not started until the color number determinations for one page worth is completed. The memory 135 is released after completion of the output of the monochrome image data, and the memories 133 and 134 are released after output of the monochrome image data is started.

The number of compression lines and the number of deletion lines may be the same or different. In this embodiment, the number of compression lines is set equal to or less than the number of deletion lines.

"The output candidate image data generation processing and the color number determination processing are executed in parallel" means that there is a period of time in which both the output candidate image data generation processing and the color number determination processing are executed simultaneously. That is, the output candidate image data generation processing and the color number determination processing need not be started at the same time. Similarly, the color image data generation processing, the grayscale image data generation processing, and the monochrome image data generation processing need not be started at the same time, but it is only necessary that a period of time in which these processing are simultaneously executed exists.

Figure 5A:
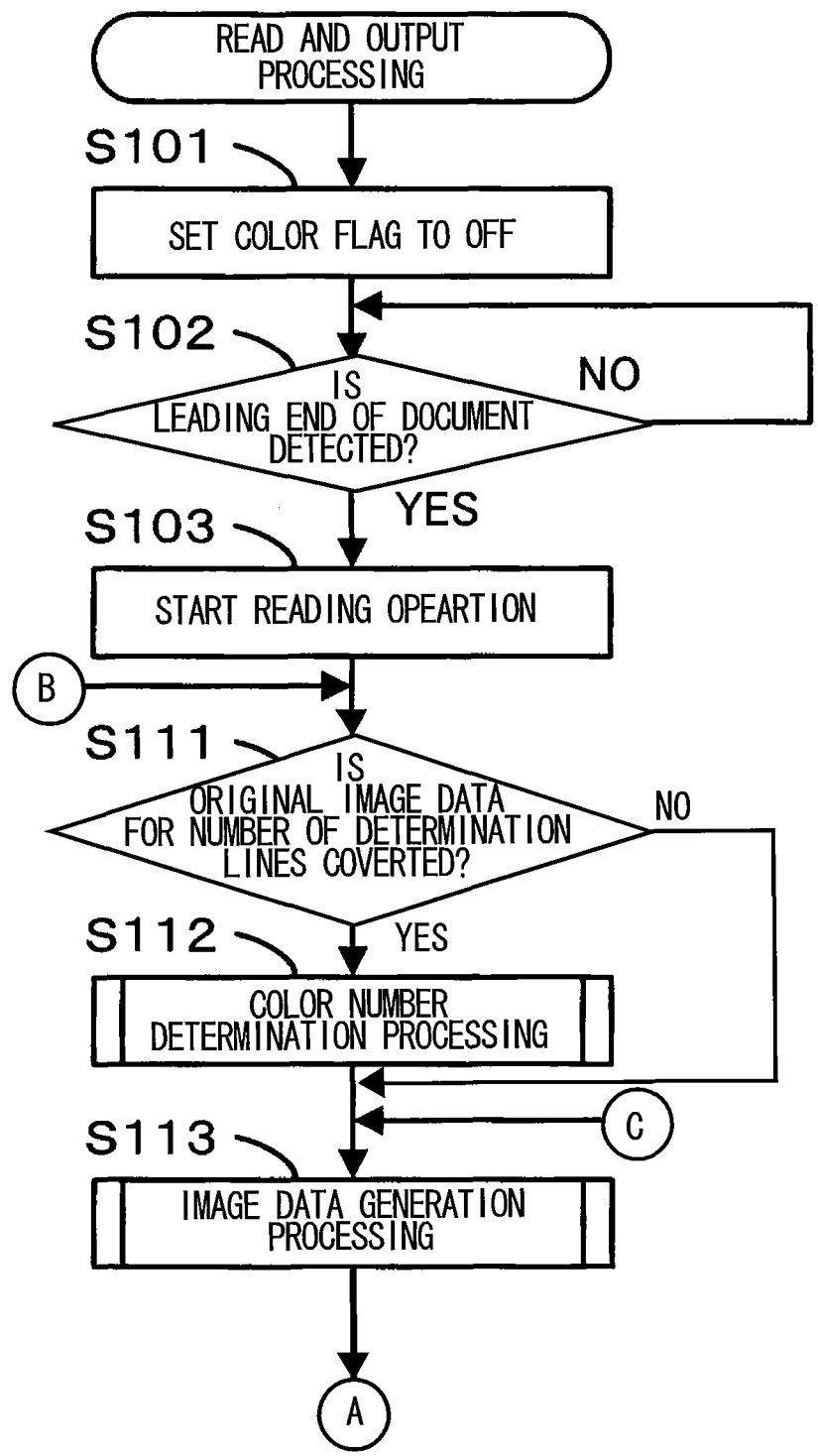
FIGS. 5A and 5B are flowchart illustrating steps in a read and output processing executed by the scanner according to the embodiment of the invention.
Figure 5B:
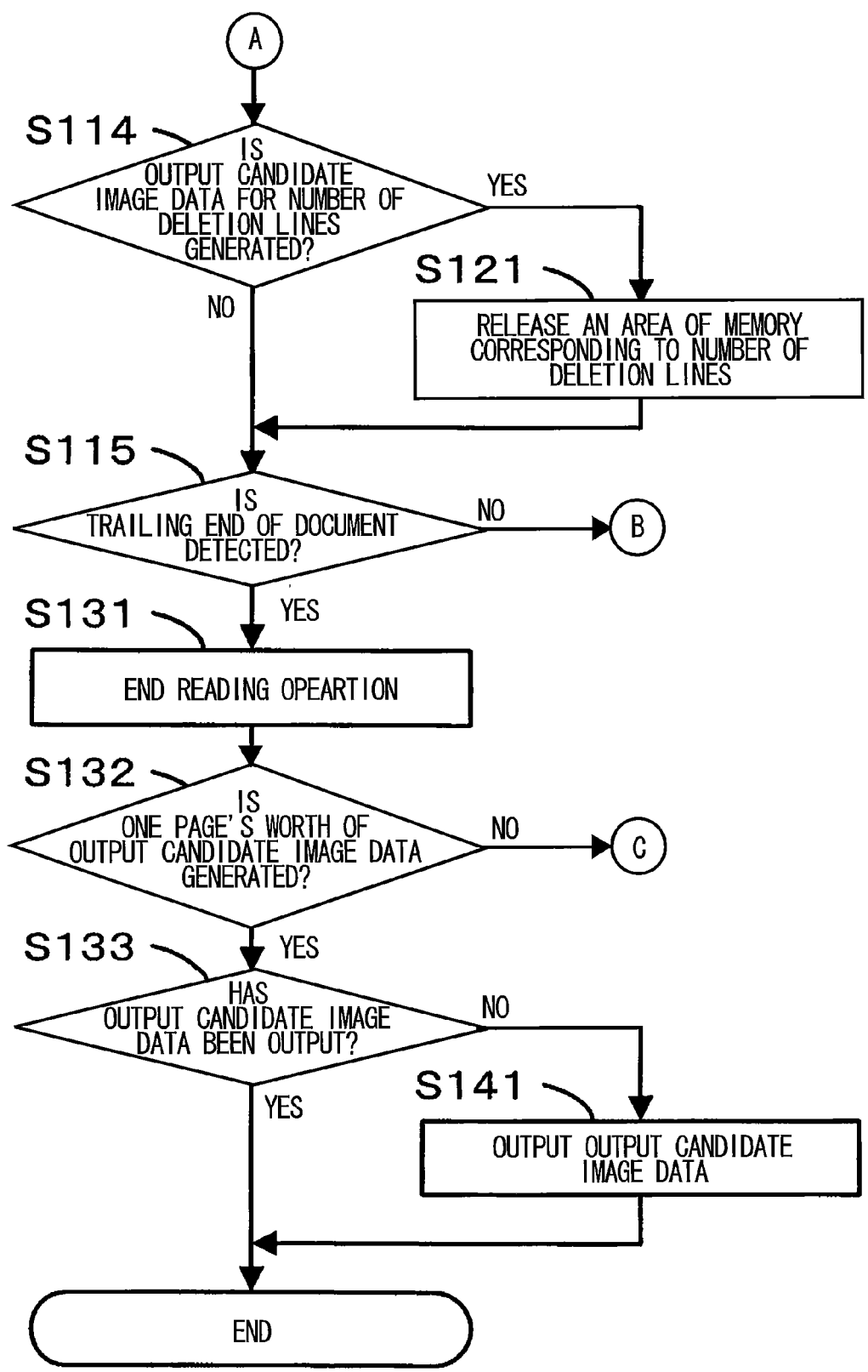

Next, a read and output processing for realizing the color image reading operation of the scanner 100 will be described with reference to FIGS. 5A and 5B The CPU 11 executes the read and output processing when the image reading unit 20 starts conveying a document S according to a reading operation start instruction from a sensor (not shown). Note that, the read and output processing may be executed by the ASIC 15, or the combination of the CPU 11 and the ASIC 15. Hereinafter, it is assumed that a single-side color image reading operation using the image sensor 21 is instructed.

In the read and output processing, the CPU 11 sets a color flag indicating the color image to OFF (S101). After processing of S101, the CPU 11 determines whether or not the sheet detection sensor 71 detects a leading end of the document S (S102). When the leading end is not detected (NO in S102), the CPU 11 waits until the leading end of the document S is detected.

When the leading end of the document S is detected (YES in S102), the CPU 11 controls the image sensor 21 to start the reading operation (S103) to read the document S. The original image data is acquired and stored in the memory 132 through this reading operation.

After processing of S103, the CPU 11 determines whether or not the conversion of the original image data sets corresponding to the number of the determination lines is completed (S111). This original image data set having the number of the determination lines is an example of one of a plurality of first blocks of data. The plurality of first blocks of data is made up of first image data having one page's worth of data size. In other words, the CPU 11 determines whether or not the original image data set is stored.

When the number of lines of the original image data acquired by the color number determination circuit 38 reaches the number of the determination lines, the CPU 11 determines that the conversion circuit 32 completes the conversion corresponding to the number of the determination lines. At this time, the original image data has been output also to the color number determination circuit 38. When the conversion corresponding to the number of the determination lines is completed (YES in S111), the CPU 11 executes color number determination processing using the color number determination circuit 38 (S112).

Figure 6:
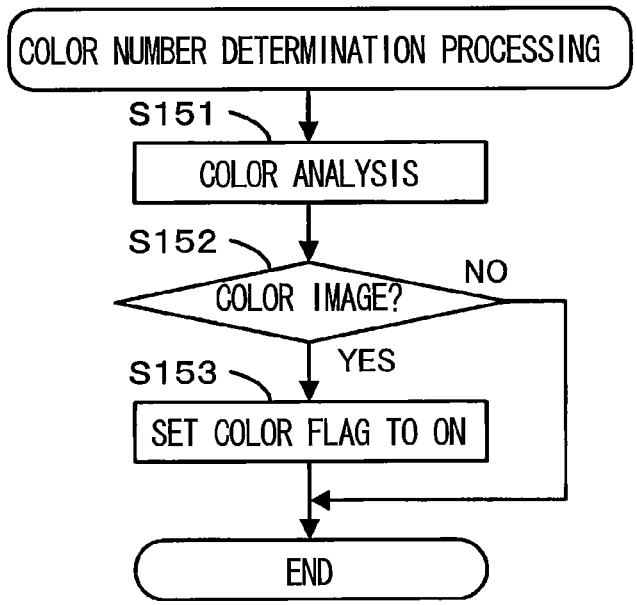
FIG. 6 is a flowchart illustrating steps in a color number determination in the read and output processing shown in FIG. 5A.

FIG. 6 is a flowchart showing the color number determination processing of S112. In the color number determination processing, the CPU 11 acquires, from the color number determination circuit 38, a result of analysis of whether or not the converted image is a color image. The color number determination circuit 38 analyzes whether or not the converted image is a color image on the basis of the original image data (YCbCr data) sets corresponding to the number of the determination lines. When the converted image is not the color image, the color determination circuit 38 further analyzes whether the converted image is a grayscale image or a monochrome image (S151). In this case, the CPU 11 acquires, from the color number determination circuit 38, a result of analysis of whether the converted image is the grayscale image or the monochrome image. In S152, the CPU 11 determines whether or not the converted image is the color image based on the analysis results acquired in S151.

When the converted image is the color image (YES in S152), the CPU 11 sets the color flag to ON (S153). After processing of S153 or when the converted image is not the color image (NO in S152), the CPU 11 ends the color number determination processing. The color number determination circuit 38 deletes the original image data that has been subjected to the color number determination from the color number determination circuit 38 itself every time the determination is completed.

Referring back to FIG. 5A, after the color number determination processing of S112, or when the conversion corresponding to the number of determination lines is not completed (NO in S111), the CPU 11 executes image data generation processing (S113). In the flowchart of FIG. 5A, processing of S112 and S113 are executed sequentially for descriptive convenience; actually, however, processing of S112 and S113 may be executed simultaneously, and execution of one of processing of S112 and S113 may be started during execution of the other one thereof.

Figure 7:
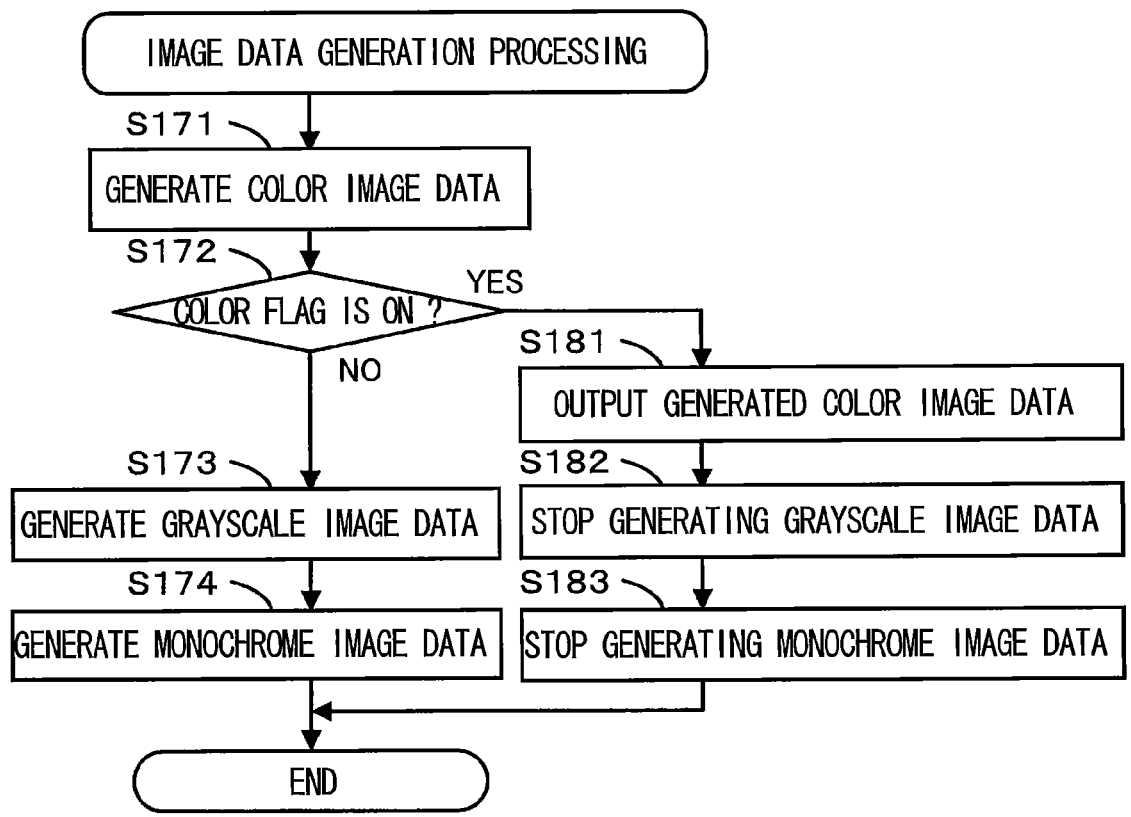
FIG. 7 is a flowchart illustrating steps in an image data generation processing in the read and output processing shown in FIG. 5A.

FIG. 7 is a flowchart showing a procedure of the image data generation processing of S113. In the image data generation processing, the CPU 11 instructs the generation system 151 to start the generation of the color image data (S171). In S172, the CPU 11 determines whether or not the color flag is ON.

When the color flag is ON (YES in S172), the CPU 11 selects the color image data and instructs the selector 36 to start outputting the generated color image data to the external device as an output destination (S181). This is because that the image data to be output is fixed to the color image data once the color flag is ON (YES in S172). Accordingly, when the color flag is ON (YES in S172), the selector 36 sequentially outputs the generated color image stored in the memory 133 before completion of generation of the color image data corresponding to one page.

After processing of S181, the CPU 11 instructs the generation system 152 to stop generating the grayscale image data (S182). Further, the CPU 11 instructs the generation system 153 to stop generating the monochrome image data (S183). That is, generations of the grayscale image data and the monochrome image data is not performed on unprocessed original image data that has not yet been processed. After processing of S183, the CPU 11 ends the image data generation processing. Processing of S182 and S183 may be executed reversely or simultaneously. Further, processing of S181, S182 and S183 may be executed reversely or simultaneously.

On the other hand, when the color flag is OFF (NO in S172), the CPU 11 instructs the generation system 152 to start generating the grayscale image data (S173). Further, the CPU 11 instructs the generation system 153 to start generating the monochrome image data (S174). After processing of S174, the CPU 11 ends the image data generation processing. Processing of S173 and S174 may be executed reversely or simultaneously.

Referring back to FIG. 5B, the CPU 11 determines whether or not the output candidate image data is generated based on the original image data corresponding to the number of deletion lines in all the generation systems that do not stop generation of the image data (S114). When generation of the output candidate image data based on the original image data for the number of deletion lines is completed (YES in S114), the CPU 11 releases a memory area of the memory 132 corresponding to the original image data of the number of deletion lines (S121). In other words, the CPU 11 deletes a set of original image data stored in the memory 132 after completion of all image processing on the set of original image data.

After processing of S121, or when generation of the output candidate image data based on the original image data for the number of deletion lines is not completed (NO in S114), the CPU 11 determines whether or not the sheet detection sensor 71 detects a trailing end of the document S (S115). When the rear end is not detected (NO in S115), the CPU 11 returns to S111 and returns the color number determination in S112.

When the trailing end of the document S is detected (YES in S115), the CPU 11 controls the image sensor 21 to end the reading operation on the basis of the detection timing when the trailing end of the document S is detected (S131). Thereafter, the CPU 11 determines, for each of all the systems in which generation of the image data is not stopped, whether or not generation of the output candidate image data for one page worth is completed (S132). When generation of the one page worth of output candidate image data is not completed (NO in S132), the CPU 11 returns to S113 and continues generation of the output candidate image data.

When generation of the output candidate image data for one page is completed (YES in S132), the CPU 11 determines whether or not the selector 36 has started outputting the output candidate image data that is determined based on the analysis results of the color number determination circuit 38 (S133). That is, the image for one page is fixed to the color image when the CPU 11 determines that the converted image is the color image in S151 even before completion of generation of the output candidate image data for one page worth. Therefore, the CPU 11 instructs the selector 36 to start outputting the color image data in S181 before completion of generation of the output candidate image data for one page worth.

On the other hand, until the CPU 11 determines that the converted image is the color image on the basis of the analysis results made by the color number determination circuit 38, the image corresponding to one page of the document S is not fixed to the color image. That is, even if the converted image is the grayscale image or the monochrome image, the color of the image is not fixed until one page worth of the color number determination is completed. It follows that even if generation of one page worth of the output candidate image data has been completed, output of the grayscale image data or the monochrome image data has not yet been started.

When output of the output candidate image data has not yet been started as in the case of the grayscale image data or the monochrome image data (NO in S133), the CPU 11 instructs the selector 36 to output the output candidate image data corresponding to the determination result (S141). Specifically, when each converted image is not the color image but the grayscale image, the selector 36 outputs the grayscale image data as the output candidate image data. When each converted image is the monochrome image, the selector 36 outputs the monochrome image data as the output candidate image data.

After processing of S141, or when the output candidate image data (color image data) started to be outputted before completion of generation of one page worth of the output candidate image data (YES in S133), the CPU 11 ends the read and output processing.

As described above, the scanner 100 according to the embodiment generates a plurality of types of the output candidate image data based on the original image data. In the scanner 100, a memory area of the memory 132 corresponding to the original image data corresponding to the number of deletion lines is released at a time point when generation of the number of deletion lines worth of the output candidate image data is completed even before the generation of one page worth of the output candidate image data is completed. That is, the plurality of types of the output candidate image data are generated while releasing the memory 132 by a unit smaller than one page. As a result, use amount of the memory 132 can be saved as compared to a configuration in which the output candidate image data is generated after one page worth of the original image data is fully stored in the memory 132.

For example, the YCbCr data is data having luminance and color-difference information for each pixel and thus has a data size considerably larger than: a data size of the color image data which is compressed data; a data size of the grayscale image data which is compressed data; and a data size of the monochrome image data in which each pixel has a binary value. Accordingly, if the memory 132 stores one page worth of the YCbCr data therein, the memory 132 needs to be larger in capacity than the memory 133.

In the embodiment, the scanner 100 releases, before one page worth of the original data is fully stored in the memory 132, a memory area of the memory 132 corresponding to a part of the original image data. The part of the original image corresponds to the output candidate image data that has already been generated. As a result, a capacity of the memory 132 can be reduced to less than a capacity for storing one page worth of the original image data. Although the capacity of the memory 132 is less than a particular capacity for storing data of one page's worth of a color image having the maximum document size and maximum resolution, the scanner 100 can output image data corresponding to one page. The maximum document size and the maximum resolution are set to be allowed by the image reading unit 20.

Further, if the generations of the plurality of output candidate image data and the determination processing of the output candidate image data are sequentially performed, it takes much time to complete output of the output candidate image data. On the other hand, the scanner 100 according to the embodiment performs the color number determination processing and the generation processing of the output candidate image data in parallel with each other. Therefore, a reduction in time required to complete output of the output candidate image data can be expected from the scanner 100, as compared to a scanner executing the generation processing and the determination processing in sequence. In order to exhibit this effect, it is only necessary to execute the color number determination processing and the generation processing in parallel. Note that the memory needs not be released in units of the number of deletion lines but, for example, the memory may be released after completion of one page worth of the output candidate image data.

Further, when the converted image is determined to be the color image in S153 before completion of generation of the grayscale image data and the monochrome image data corresponding to the converted image, the scanner 100 starts outputting the color image data that has been generated based on the converted image. With this configuration, the output processing can be quickly completed.

Further, when the converted image is determined to be the color image in S153 before completion of generation of the grayscale image data and the monochrome image data, the scanner 100 stops outputting the grayscale image data and the monochrome image data. With this configuration, unnecessary processing can be eliminated to reduce processing load of the scanner 100.

While the invention has been described in detail with reference to the embodiment thereof, it would be apparent to those skilled in the art that various changes and modifications may be made therein without departing from the spirit of the invention.

For example, the image reading apparatus is not limited to the scanner, but the present invention may be applied to a device possessing a reading function, such as a copier, a multifunction machine or a FAX.

Further, in the embodiment, the image sensors 21 and 22 are disposed at fixed positions and the document S moves relative to the image sensors 21 and 22 during an operation for reading an image on the document S. However, the document S may be replaced on a document replacement table so as to be incapable of moving, and the image sensors 21 and 22 may move relative to the document S.

In the embodiment, a memory area of the memory 132 corresponding to the number of deletion lines is released immediately after the output candidate image data is generated based on the number of deletion lines worth of the original image data in each generation system 151, 152 and/or 153 that is not stopped. However, a release timing of the memory 132 may be determined in combination with another condition. For example, the memory area of the memory 132 may be released when the following conditions are satisfied: a condition that the generation of the output candidate image data based on the number of deletion lines worth of the original image data is completed; and a condition that the unused area of the memory 132 is less than or equal to a threshold value.

Further, in the embodiment, the color image data, the grayscale image data, and the monochrome image data are generated as the plurality of types of the output candidate image data. However, all the three image data need not to be generated. At least two of the three image data may be generated. With this configuration, a more preferable type of image data can be selected according to the number of colors of the document image. As a result, a data size can be reduced as needed.

Further, the plurality of types of output candidate image data may be distinguished from each other not only based on the number of colors, but also based on whether the data is compressed data or uncompressed data, or based on whether the data is multi-valued or binary.

In the embodiment, the output candidate image data to be actually output is determined based on a result of the color number determination; however, the present invention is not limited to this. For example, the output candidate image data may be removed image data and non-removed image data that and generated in parallel and based on the original image data stored in the memory 132. The removed image data is data indicative of an image that is obtained by removing a background color from the original image. The non-removed image data is data indicative of an image in which the background color is not removed from the original image. The background color may be a fixed color or a user-specified color. Even with this configuration, the conversion circuit 32 may release a memory area of the memory 132 corresponding to the number of deletion lines when the original image data corresponding to the number of deletion lines becomes unnecessary in all of the generation systems that continue generating the output candidate image data. Further, there may be provided a background determination circuit that determines, based on the number of determination lines worth of the original image data, whether or not removal of a background color is necessary in parallel with the generation processing of each output candidate image data. In this case, the output candidate image data may be selected according to the determination result from the background determination circuit. The background determination circuit may determine that the removal of the background color is necessary when a ratio of the background color to the original image data corresponding to the number of determination lines is equal to or higher than a predetermined value.

Specifically, as shown in FIGS. 6 and 7, the controller 10 may analyzes the converted image data in S151 and may determine whether or not the background should be removed in S152. The controller 10 may set a flag to ON (S153) if the background should be removed (S152: YES), and may generate removed image data in S171. If the flag is on (S172: YES), the controller may output the generated removed image data in S181 and may stop generating non-removed image data in S182 and S183. On other hand, if the flag is off (S172: NO), the controller may generate the non-removed image data in S173 and 174.

In the embodiment, the scanner 100 selects, as the output image data, one of the plurality of output candidate image data on the basis of the results of the color number determination. However, the output image data is not limited to one, but all the plurality of the output candidate image data may be output, or some of the plurality of the output candidate image data may be output. In other words, the output image data need not be limited to one output candidate image data based on the color number determination, but all sets of the generated image data may be output to an output destination device. In this case, the user may select, through the output destination device, one of the plurality of sets of image data as output image data.

In the embodiment, the color image data and the grayscale image data are compressed data, but the color image data and the grayscale image data may be uncompressed data. However, the color image data and the grayscale image data are expected to be large in data size, so that they are preferably subjected to compression.

In the embodiment, a memory area of the memory 132 corresponding to the predetermined amount (predetermined number of deletion lines worth) is released when generation of all the output candidate image data corresponding to the predetermined amount of the original image data is completed. However, the predetermined amount of the memory may be released upon satisfying the condition that the original image data having the predetermined amount becomes unnecessary, or may be released before the output candidate image data corresponding to predetermined amount of the original image data has been generated in all generation systems. For example, the predetermined amount of the original image data may be acquired from the memory 132 and stored into buffer memory 11' of the CPU 11, and then the output candidate image data may be generated based on the predetermined amount of the original image data stored in the buffer memory 11'. In this case, the CPU 11 may determine in S114 whether or not the predetermined amount of the original image data has been stored into the buffer memory 11', and may release a memory area of the memory 132 corresponding to the predetermined amount when the predetermined amount of the original data has been stored in the buffer memory 11'. The buffer memory 11' to be used here may be shared by all the generation systems, or may be provided for each generation system.

Further, the processing described in the embodiment may be executed by hardware such as a single CPU, a plurality of CPUs, an ASIC and the like or a combination thereof. Also, the processing described in the embodiment may be implemented in a variety of modes such as a recording medium having a program for executing the processing recorded therein, a method thereof and the like.

What is claimed is:
1. An image reading apparatus comprising:
a reading unit configured to read a document;
a storage unit; and
a control device configured to:
    control the reading unit to start reading the document, causing first image data to be generated following reading of the document, the generated first image data having one page's worth of data size and comprising a plurality of first blocks of data, each of the plurality of first blocks of data having a predetermined data size less than the one page's worth of data size;
    store the generated first image data in the storage unit on a block-to-block basis to sequentially store each of the plurality of first blocks of data;
    perform, each time each of the plurality of first blocks of data is stored in the storage unit, a plurality of image processing on the each of the plurality of first blocks of data to generate a second block of data including a plurality of types of data different from one another, one page's worth of second image data being generated by performing the plurality of image processing on the plurality of first blocks of data;
    delete one of the plurality of first blocks of data stored in the storage unit after completion of the plurality of image processing on the one of the plurality of first blocks of data before completion of the plurality of image processing on all of the plurality of first blocks of data;
    determine, as output image data, at least one of the plurality of types of data based on at least one of the plurality of first blocks of data stored in the storage unit, determination of the output image data being performed in parallel with the plurality of image processing on the plurality of first block of data;
    output, upon completing determination of the output image data based on a part of the plurality of first blocks of data before completion of generating one page's worth of second image data, the at least one of the plurality of types of data that is determined as the output image data and is generated based on the part of the plurality of first blocks of data; and
    stop generating a remaining type of data based on a remaining part of the plurality of first blocks of data upon completing determination of the output image data based on a part of the plurality of first blocks of data before completion of generating one page's worth of second image data, the remaining type of data being included in the plurality of types of data and other than the at least one of the plurality of types of data that is determined as the output image data, the remaining part of the plurality of first blocks of data being other than the part of the plurality of first blocks of data and on which the plurality of image processing are not yet processed.

2. The image reading apparatus according to claim 1, wherein the plurality of image processing include at least two among:
   a first image processing for generating color image data;
   a second image processing for generating grayscale image data; and
   a third image processing for generating monochrome image data.

3. The image reading apparatus according to claim 1, wherein the plurality of image processing include:
   an image processing for generating binary image data; and
   an image processing for generating multiple image data represented by a value of a prescribed number-levels, the prescribed number being greater than or equal to three.

4. The image reading apparatus according to claim 1, wherein the plurality of image processing include:
   an image processing for compressing image data to generate compressed image data; and
   an image processing for generating uncompressed image data.

5. The image reading apparatus according to claim 1, wherein the plurality of image processing include:
   an image processing for generating removed image data indicative of an image in which a background color is removed; and
   an image processing for generating non-removed image data indicative of an image in which the background color is not removed.

6. The image reading apparatus according to claim 1, wherein a capacity of the storage unit is less than a particular capacity for storing data of one page's worth of a color image having a maximum size of the document that the image reading unit can read and a maximum resolution that the image reading unit can set.

7. An image reading apparatus comprising:
   a reading unit configured to read a document;
   a storage unit; and
   a control device including a buffer memory and configured to:
      control the reading unit to start reading the document, causing first image data to be generated following reading of the document, the generated first image data having one page's worth of data size and comprising a plurality of first blocks of data, each of the plurality of first blocks of data having a predetermined data size less than the one page's worth of data size;
      store the generated first image data in the storage unit on a block-to-block basis to sequentially store each of the plurality of first blocks of data;
      acquire the generated first image data from the storage unit on a block-to-block basis to sequentially store each of the plurality of first blocks of data in the buffer memory;
      perform, each time each of the plurality of first blocks of data is stored in the buffer memory, a plurality of image processing on the each of the plurality of first blocks of data stored in the buffer memory to generate a second block of data including a plurality of types of data different from one another, one page's worth of second image data being generated by performing the plurality of image processing on the plurality of first blocks of data;
      delete one of the plurality of first blocks of data stored in the storage unit after completion of storing the one of the plurality of first blocks of data in the buffer memory before completion of the plurality of image processing on all of the plurality of first blocks of data;
      determine, as output image data, at least one of the plurality of types of data based on at least one of the plurality of first blocks of data stored in the storage unit, determination of the output image data being performed in parallel with the plurality of image processing on the plurality of first blocks of data; and
      output, upon completing determination of the output image data based on a part of the plurality of first blocks of data before completion of generating one page's worth of second image data, the at least one of the plurality of types of data that is determined as the output image data and is generated based on the part of the plurality of first blocks of data; and
      stop generating a remaining type of data based on a remaining part of the plurality of first blocks of data upon completing determination of the output image data based on a part of the plurality of first blocks of data before completion of generating one page's worth of second image data, the remaining type of data being included in the plurality of types of data and other than the at least one of the plurality of types of data that is determined as the output image data, the remaining part of the plurality of first blocks of data being other than the part of the plurality of first blocks of data and on which the plurality of image processing are not yet processed.

8. A method comprising:
   controlling a reading unit to start reading a document, causing first image data to be generated following reading of the document, the generated first image data having one page's worth of data size and comprising a plurality of first blocks of data, each of the plurality of first blocks of data having a predetermined data size less than the one page's worth of data size;
   storing the generated first image data in a storage unit on a block-to-block basis to sequentially store each of the plurality of first blocks of data;
   performing, each time each of the plurality of first blocks of data is stored in the storage unit, a plurality of image processing on the each of the plurality of first blocks of data to generate a second block of data including a plurality of types of data different from one another, one page's worth of second image data being generated by performing the plurality of image processing on the plurality of first blocks of data;
   deleting one of the plurality of first blocks of data stored in the storage unit after completion of the plurality of image processing on the one of the plurality of first blocks of data before completion of the plurality of image processing on all of the plurality of first blocks of data;
   determining, as output image data, at least one of the plurality of types of data based on at least one of the plurality of first blocks of data stored in the storage unit, determination of the output image data being performed in parallel with the plurality of image processing on the plurality of first blocks of data;

outputting, upon completing determination of the output image data based on a part of the plurality of first blocks of data before completion of generating one page's worth of second image data, the at least one of the plurality of types of data that is determined as the output image data and is generated based on the part of the plurality of first blocks of data; and stopping generating a remaining type of data based on a remaining part of the plurality of first blocks of data upon completing determination of the output image data based on a part of the plurality of first blocks of data before completion of generating one page's worth of second image data, the remaining type of data being included in the plurality of types of data and other than the at least one of the plurality of types of data that is determined as the output image data, the remaining part of the plurality of first blocks of data being other than the part of the plurality of first blocks of data and on which the plurality of image processing are not yet processed.

9. A method comprising:

controlling a reading unit to start reading a document, causing first image data to be generated following reading of the document, the generated first image data having one page's worth of data size and comprising a plurality of first blocks of data, each of the plurality of first blocks of data having a predetermined data size less than the one page's worth of data size;

storing the generated first image data in a storage unit on a block-to-block basis to sequentially store each of the plurality of first blocks of data;

acquiring the generated first image data from the storage unit on a block-to-block basis to sequentially store each of the plurality of first blocks of data in a buffer memory;

performing, each time each of the plurality of first blocks of data is stored in the buffer memory, a plurality of image processing on the each of the plurality of first blocks of data stored in the buffer memory to generate a second block of data including a plurality of types of data different from one another, one page's worth of second image data being generated by performing the plurality of image processing on the plurality of first blocks of data;

deleting one of the plurality of first blocks of data stored in the storage unit after completion of storing the one of the plurality of first blocks of data in the buffer memory before completion of the plurality of image processing on all of the plurality of first blocks of data;

determining, as output image data, at least one of the plurality of types of data based on at least one of the plurality of first blocks of data stored in the storage unit, determination of the output image data being performed in parallel with the plurality of image processing on the plurality of first blocks of data;

outputting, upon completing determination of the output image data based on a part of the plurality of first blocks of data before completion of generating one page's worth of second image data, the at least one of the plurality of types of data that is determined as the output image data and is generated based on the part of the plurality of first blocks of data; and stopping generating a remaining type of data based on a remaining part of the plurality of first blocks of data upon completing determination of the output image data based on a part of the plurality of first blocks of data before completion of generating one page's worth of second image data, the remaining type of data being included in the plurality of types of data and other than the at least one of the plurality of types of data that is determined as the output image data, the remaining part of the plurality of first blocks of data being other than the part of the plurality of first blocks of data and on which the plurality of image processing are not yet processed.

10. The image reading apparatus according to claim 7, wherein the plurality of image processing include at least two among:
   a first image processing for generating color image data;
   a second image processing for generating grayscale image data; and
   a third image processing for generating monochrome image data.

11. The image reading apparatus according to claim 7, wherein the plurality of image processing include:
   an image processing for generating binary image data; and
   an image processing for generating multiple image data represented by a value of a prescribed number-levels, the prescribed number being greater than or equal to three.

12. The image reading apparatus according to claim 7, wherein the plurality of image processing include:
   an image processing for compressing image data to generate compressed image data; and
   an image processing for generating uncompressed image data.

13. The image reading apparatus according to claim 7, wherein the plurality of image processing include:
   an image processing for generating removed image data indicative of an image in which a background color is removed; and
   an image processing for generating non-removed image data indicative of an image in which the background color is not removed.

14. The image reading apparatus according to claim 7, wherein a capacity of the storage unit is less than a particular capacity for storing data of one page's worth of a color image having a maximum size of the document that the image reading unit can read and a maximum resolution that the image reading unit can set.

* * * * *